(12) United States Patent
Sarashina

(10) Patent No.: US 9,331,809 B2
(45) Date of Patent: May 3, 2016

(54) DWA CONTROL IN AN OLT WITH DECREASE IN MARGIN OF BANDWIDTH UTILIZATION CAUSED BY BANDWIDTH REALLOCATION MINIMIZED

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/575,398

(22) Filed: Dec. 18, 2014

(65) Prior Publication Data
US 2015/0280851 A1 Oct. 1, 2015

(30) Foreign Application Priority Data
Mar. 26, 2014 (JP) ................................ 2014-063811

(51) Int. Cl.
*H04J 14/02* (2006.01)
(52) U.S. Cl.
CPC ........... *H04J 14/023* (2013.01); *H04J 14/0247* (2013.01); *H04J 14/0252* (2013.01)
(58) Field of Classification Search
CPC .................... H04J 14/0247; H04J 14/0252
See application file for complete search history.

(56) References Cited

U.S. PATENT DOCUMENTS

2011/0085795 A1* 4/2011 Ozaki ................. H04J 14/0282
398/25
2014/0314414 A1* 10/2014 Cheng ..................... H04J 14/02
398/68

FOREIGN PATENT DOCUMENTS

JP 2011-135280 A 7/2011

OTHER PUBLICATIONS

Yukio Hirano, et al., "A Study of Link Monitoring Methods during ONU Power Saving on PON system" Communication Society Conference of The Institute of Electronics, Information and Communication Engineers, Sep. 2011, B-8-1.
Tomoaki Yoshida, et al., "An automatic load-balancing DWBA algorithm considering long-time tuning devices for A-tunable WDM/TDM-PON" ECOC 2013, We.2.F.5, NTT Access Network Service Systems Laboratories, NTT Corporation.

* cited by examiner

*Primary Examiner* — Shi K Li
(74) *Attorney, Agent, or Firm* — Rabin & Berdo, P.C.

(57) ABSTRACT

In a TDM/WDM-PON using cyclic sleep, a controller in an OLT calculates the total bandwidth in use for each OSU, and compares the total bandwidth with a threshold. If the calculated bandwidth exceeds the threshold, the controller determines the number of ONUs staying in sleep mode among the ONUs managed by the assignor OSU. If such an ONU exists, that ONU is selected as an ONU whose management is to be changed. From the total bandwidth in use of an assignor OSU from which the management is to be changed, a bandwidth allocated to the ONU which is in sleep mode is subtracted to thereby obtain a bandwidth, which will be compared with the threshold. If the calculated bandwidth exceeds the threshold, from among active ONUs managed by the assignor OSU an ONU whose management is to be changed is selected.

5 Claims, 8 Drawing Sheets

DWA CONTROL IN AN OLT WITH DECREASE IN MARGIN OF BANDWIDTH UTILIZATION CAUSED BY BANDWIDTH REALLOCATION MINIMIZED

BACKGROUND OF THE INVENTION

1. Field of the Invention

The present invention relates to a method for controlling dynamic wavelength allocation, and more particularly to such a method in an optical line terminal in an optical communications network system formed by one or more optical network units together with the optical line terminal, which includes a plurality of optical subscriber units. The present invention also relates to such an optical line terminal.

2. Description of the Background Art

A communication network that connects telecommunications carrier's equipment to subscribers' equipment is called an access network. With the increase in communication traffic in these days, among access networks, optical access networks become predominant, which rely upon optical communication to allow a huge amount of information to be transmitted.

One type of optical access networks is a passive optical network (PON). Generally, the PON system includes a single optical line terminal (OLT) provided in a common carrier's premises, a plurality of optical network units (ONUs) provided in subscribers' premise, and an optical splitter. The OLT and ONUs are connected with the optical splitter by optical fiber lines.

A single-core optical fiber line is used to connect the OLT with the optical splitter. The single-core fiber line is split by the optical splitter and shared between the plurality of ONUs. The optical splitter is an inexpensive passive device. Thus, the PON system is economical and easy to maintain. For those reasons, PONs become rapidly introduced.

In the PON system, signals directed from ONUs to the OLT, i.e. upstream optical signals, are combined by the optical splitter and transmitted to the OLT, while a signal directed from the OLT to the ONUs, i.e. a downstream optical signal, is split by the optical splitter into signals, which are in turn transmitted to the ONUs. In order to prevent interference between upstream and downstream optical signals with each other, the upstream and downstream optical signals are allocated to wavelengths different therebetween.

Various types of multiplexing schemes are used in PONs. The multiplexing schemes used in PONs include time division multiplex (TDM), which allocate time slots different on the time axis to subscriber terminals, wavelength division multiplex (WDM), which allocates different wavelengths to subscriber terminals, and code division multiplex (CDM), which allocates different codes to subscriber terminals. Among those multiplexing schemes, PONs using the TDM, i.e. TDM-PONs, are currently most widely used. In TDM-PONs, time division multiple access (TDMA) is predominantly used. According to the TDMA, control is made such that an OLT manages the timing of transmission from ONUs so as to prevent upstream optical signals from colliding with each other between those ONUs.

A sort of PON system that uses Ethernet (trademark) is called Ethernet-PON, and a PON system that uses Gigabit ($1 \times 10^9$ bit/sec) Ethernet is called GE-PON. The GE-PON is standardized by IEEE (The Institute of Electrical and Electronics Engineers, Inc.) 802.3 ah and IEEE 802.3 av, for example.

Optical access networks may employ cyclic sleep, in which ONUs that are not involved in communications are periodically placed in sleep mode in order to reduce power consumption in the systems, as taught by Yukio Hirano, et al., "A Study of Link Monitoring Methods during ONU Power Saving on PON system" Communication Society Conference of The Institute of Electronics, Information and Communication Engineers, September 2011, B-8-1. The cyclic sleep will be described below with reference to FIG. 1. FIG. 1 is a sequence diagram illustrating the cyclic sleep. An example will be described in which the first one of plural ONUs enters its sleep mode.

The cyclic sleep proceeds in the following fashion. The first ONU which stays in no upstream traffic condition transmits a sleep request (RQ) signal 600 to an OLT. The OLT, when having received the sleep request signal 600, determines that downstream traffic to the first ONU has not occurred in this example, and transmits a sleep permission signal 602 to the first ONU. The first ONU receives the sleep permission signal 602 to enter its sleep mode 604.

The sleep permission signal 602 contains information on activation time at which the first ONU entering its sleep mode is to be activated. When the activation time comes, the first ONU in its sleep mode becomes reactivated. The OLT transmits a GATE message 606 to the reactivated first ONU. The first ONU receives the GATE message 606. If the first ONU determines that upstream traffic has not occurred, it transmits a REPORT message 608 to the OLT and enters its sleep mode 604 again. Then the OLT periodically transmits a GATE message 606 to the first ONU. The first ONU is periodically activated from its sleep mode 604 at the GATE message transmission intervals. The first ONU receives a GATE message 606 and transmits a REPORT message 608 in a period 610 during which the first ONU is active. In this way, in the cyclic sleep, an ONU in its sleep mode is periodically awoken, and a GATE message 606 and a REPORT message 608 are transmitted and received between the OLT and the ONU to thereby maintain the PON link between the OLT and the ONU while being in its sleep mode. Accordingly, the OLT needs to provide transmission and reception bandwidths also to the ONU in its sleep mode.

Note that the time intervals at which the OLT transmits a GATE message correspond to dynamic bandwidth allocation (DBA) intervals 612, as with the time intervals at which the OLT transmits a GATE message to active ONUs. Accordingly, the time intervals at which the ONU in its sleep mode is activated correspond to the DBA intervals.

Meanwhile, a PON using TDM and WDM in combination, i.e. TDM/WDM-PON, has been proposed, see U.S. patent application publication No. US 2011/0085795 A1 to Ozaki and Japanese patent laid-open publication No. 2011-135280, for example. There are TDM/WDM-PON systems in which the OLT has a plurality of optical subscriber units (OSUs), for example.

In a TDM/WDM-PON system, OSUs are allocated to transmission wavelengths different from each other. Each of the OSUs transmits a downstream optical signal on the transmission wavelength specifically allocated thereto. In turn, each ONU transmits an upstream optical signal on a transmission wavelength and timing indicated by the downstream optical signal sent by the OSU managing that ONU.

In the TDM/WDM-PON system, since communication is performed on wavelengths specific to the respective OSUs, the ONUs are adapted to have the wavelengths changeable on which they can transmit and receive signals. For that aim, the receiver of the ONUs is provided with a wavelength-tunable filter that can change its receivable wavelength on which downstream optical signals are conveyed. In addition, the transmitter of the ONUs is provided with a wavelength-tunable optical transmitter device that can change a wavelength on which it transmits upstream optical signals.

It is sufficient that each ONU is registered in any one of a plurality of OSUs. Therefore, in the TDM/WSM-PON system, a plurality of ONUs may distributively be managed among those OSUs. In such a case, the dynamic wavelength allocation (DWA) may be applied to the OLT to thereby allow each OSU to manage plural ONUs of which the number is variable depending on communication conditions, such as traffic conditions, see Tomoaki Yoshida, et al., "An automatic load-balancing DWBA algorithm considering long-time tuning devices for λ-tunable WDM/TDM-PON" ECOC 2013, We.2.F.5, NTT Access Network Service Systems Laboratories, NTT Corporation, for example.

In each OSU, a threshold is set for bandwidth which is to be allocated to ONUs, such bandwidth being also referred to as a bandwidth in use. The threshold is set to a value lower than the maximum bandwidth each OSU can allocate to the ONUs, the value being 80% of the maximum value, for example. The threshold is set either for bandwidth on which each OSU transmits downstream signals to ONUs or bandwidth on which it receives upstream signals from ONUs. In an OSU of interest, as traffic between the OSU and ONUs managed thereby increases, the bandwidth may exceed the threshold. In this case, DWA control may shift one or more of the ONUs managed by the OSU whose bandwidth in use exceeds the threshold to another OSU whose bandwidth in use is well below its threshold, which may be referred to as assignee OSU.

As a result of the DWA, the amount of traffic is substantially flattened, or load-balances, among the OSUs, resulting in increasing the service bandwidth provided to subscriber units. By the load-balancing, the TDM/WDM-PON system can as a whole maintain its quality of communication.

Note that ONUs of which the management is shifted by DWA to an assignee OSU will change their transmission and reception wavelengths specific to the assignee OSU.

With reference to FIGS. 2A and 2B, DWA will be detailed on a case where the cyclic sleep is applied to a TDM/WDM-PON. FIGS. 2A and 2B schematically illustrate how an OSU changeably allocates bandwidths in use to ONUs it manages. FIGS. 2A and 2B illustrate bandwidths in use before and after DWA, respectively. In the figures, the vertical axes represent bandwidth in use in arbitrary unit. Note that, in this example, the OSU manages a plurality (n) of ONUs, ONU-1 to ONU-n, including ONU-m rendered in sleep mode, where m is a natural number not exceeding a natural number n. The threshold 500 for the OSU is set to 80% of the maximum bandwidth 510 available for communication with the ONUs.

When the cyclic sleep is applied to a TDM/WDM-PON, each OSU transmits and receives a sleep permission signal and a sleep request signal, respectively, and periodically transmits and receives a GATE message and a REPORT message, respectively, to and from the ONUs which the OSU manages. Accordingly, the OSU managing an ONU got in sleep mode needs to prepare a bandwidth to be allocated to the ONU for use in transmitting a GATE message and receiving a REPORT message to and from that ONU. Consequently, that OSU suffers from deterioration in margin of bandwidth utilization caused by the allocation of the bandwidth to ONU-m staying in sleep mode, as illustrated in FIG. 2A. Thus, the total bandwidth 502 and 504 allocated to the ONUs exceeds the threshold 500 as shown in FIG. 2A.

In order to render the total bandwidth falling below the threshold 500, DWA is performed to shift the management of some of the ONUs to another OSU as illustrated in FIG. 2B.

In this example, the management of two active ONUs, ONU-3 and ONU-4, is switched to another OSU.

In this way, application of the cyclic sleep to a TDM/WDM-PON involves the problem that allocation of a bandwidth to an ONU staying in sleep mode causes the margin of bandwidth utilization to decrease. As a result, the DWA may suffer from increase in the number of active ONUs of which the management is to be shifted to other OSUs.

As has been described above, ONUs whose management is shifted to other, i.e. assignee, OSUs change their transmission and reception wavelengths specific to the assignee OSUs. Active ONUs have to temporarily interrupt communication in order to prevent a frame or frames from being lost during a time period in which transmission and reception wavelengths are being changed. It would be possible that upstream and downstream signals that occur in a time period in which the transmission and reception wavelengths are being changed may be buffered until the wavelength has changed. Such interruption of communication and signal buffering would, however, lead to communication delay.

SUMMARY OF THE INVENTION

It is an object of the present invention to provide a DWA control method capable of minimizing deterioration in margin of bandwidth utilization caused by bandwidth reallocation.

It is a more specific object of the present invention to provide a DWA control method, in a TDM/WDM-PON system having cyclic sleep applied, capable of minimizing a decrease in margin of bandwidth utilization otherwise caused by allocating bandwidth to ONUs staying in sleep mode.

It is another specific object of the present invention to provide a DWA control method, in a TDM/WDM-PON system having cyclic sleep applied, capable of reducing the number of active ONUs of which the management is to be changed under the DWA control.

In accordance with the present invention, in a controller of central-office equipment forming an optical communications network together with a plurality of subscriber units connected to the central-office equipment by an optical transmission channel, wherein the central-office equipment includes a plurality of terminator units, each of which is allocated to one of wavelengths which is different from each other, and each of the subscriber units includes a wavelength-tunable filter, a dynamic wavelength allocation control method comprises: calculating, for each of the plurality of terminator units, a total bandwidth allocated in use to the subscriber units managed by the terminator unit; comparing, for each of the plurality of terminator units, the total bandwidth in use with a predetermined threshold to determine whether to change the terminator unit managing the subscriber units; selecting, when a result of the comparison reveals that at least one of the plurality of terminator units has the total bandwidth in use exceeding the threshold, an assignor terminator unit from among the at least one terminator unit; determining the number of subscriber units staying in sleep mode among the subscriber units managed by the assignor terminator unit, and selecting, if the number is not zero, one of the subscriber units which is in sleep mode as an subscriber unit of which management is to be changed; calculating a bandwidth by subtracting a bandwidth allocated to the selected subscriber unit from the total bandwidth in use of the assignor terminator unit, and comparing the calculated bandwidth with the threshold to determine whether to change an terminator unit managing active one of the plurality subscriber units; and selecting, when the calculated bandwidth exceeds the threshold, an subscriber unit of which the management is to be changed from among the active subscriber units managed by the assignor terminator unit.

In the DWA control method according to the present invention, an ONU in sleep mode is preferentially selected as an ONU of which the management is to be shifted to another OSU. If, among the ONUs managed by the OSU, an ONU in sleep mode is included, that ONU is selected as an ONU whose management is to be changed. Consequently, in an optical communication network where the cyclic sleep is used, a decrease in margin of bandwidth utilization due to the bandwidth allocated to ONUs staying in sleep mode in the assignor OSU is alleviated.

If the bandwidth resulting from subtraction of the bandwidth allocated to an ONU staying in sleep mode from the total bandwidth in use, i.e. the bandwidth allocated to active ONUs, does not exceed a threshold, the management of an active ONU or ONUs is not excessively changed. If the bandwidth allocated to the active ONUs exceeds the threshold, active ONUs whose management is to be changed can be minimized in number.

When the wavelength of an ONU in sleep mode is changed, interruption of communication and signal buffering are not required. In addition, as described above, when the management of active ONUs is to be changed, the number of such active ONUs can be minimized. Accordingly, the influences of the interruption of communication and signal buffering can be minimized. Thus, the DWA control method according to the present invention can reduce delay in communication due to changing the management of ONUs in an optical network where cyclic sleep is used.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Now, an illustrative embodiment of the present invention will be described with reference to the accompanying drawings. The arrangement of constituent components is merely illustrative to the extent of providing a clear understanding of the present invention. In the description of a preferred embodiment of the invention, specifics such as numerical conditions are also merely illustrative. Thus, the present invention may not be limited to the embodiment described below but modifications and variations that can achieve advantageous effects of the present invention are possible without departing from the scope of the present invention.

Figure 1:
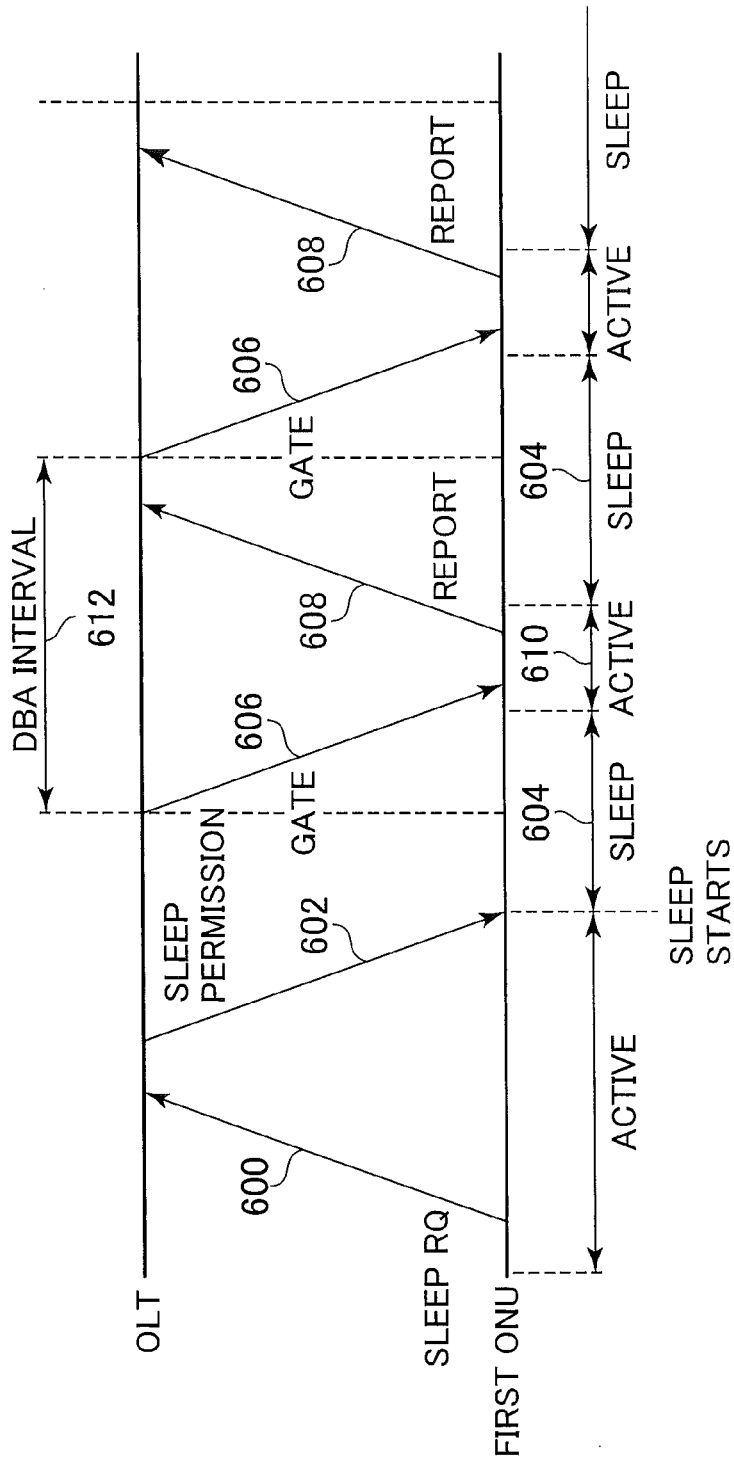
FIG. 1 is a sequence diagram schematically illustrating a cyclic sleep mode.
Figure 2A:
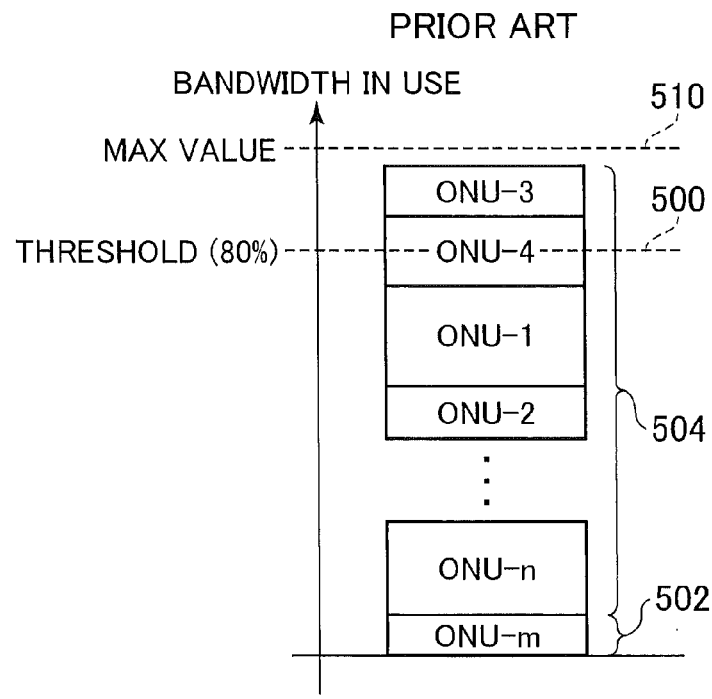
FIGS. 2A and 2B schematically show bandwidths allocated in use to ONUs managed by an OSU under the conventional DWA.
Figure 2B:
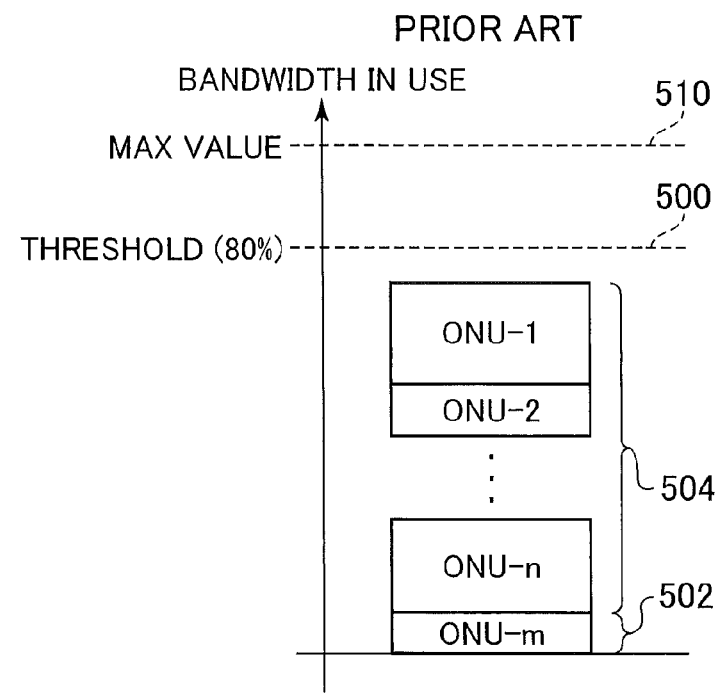
Figure 3:
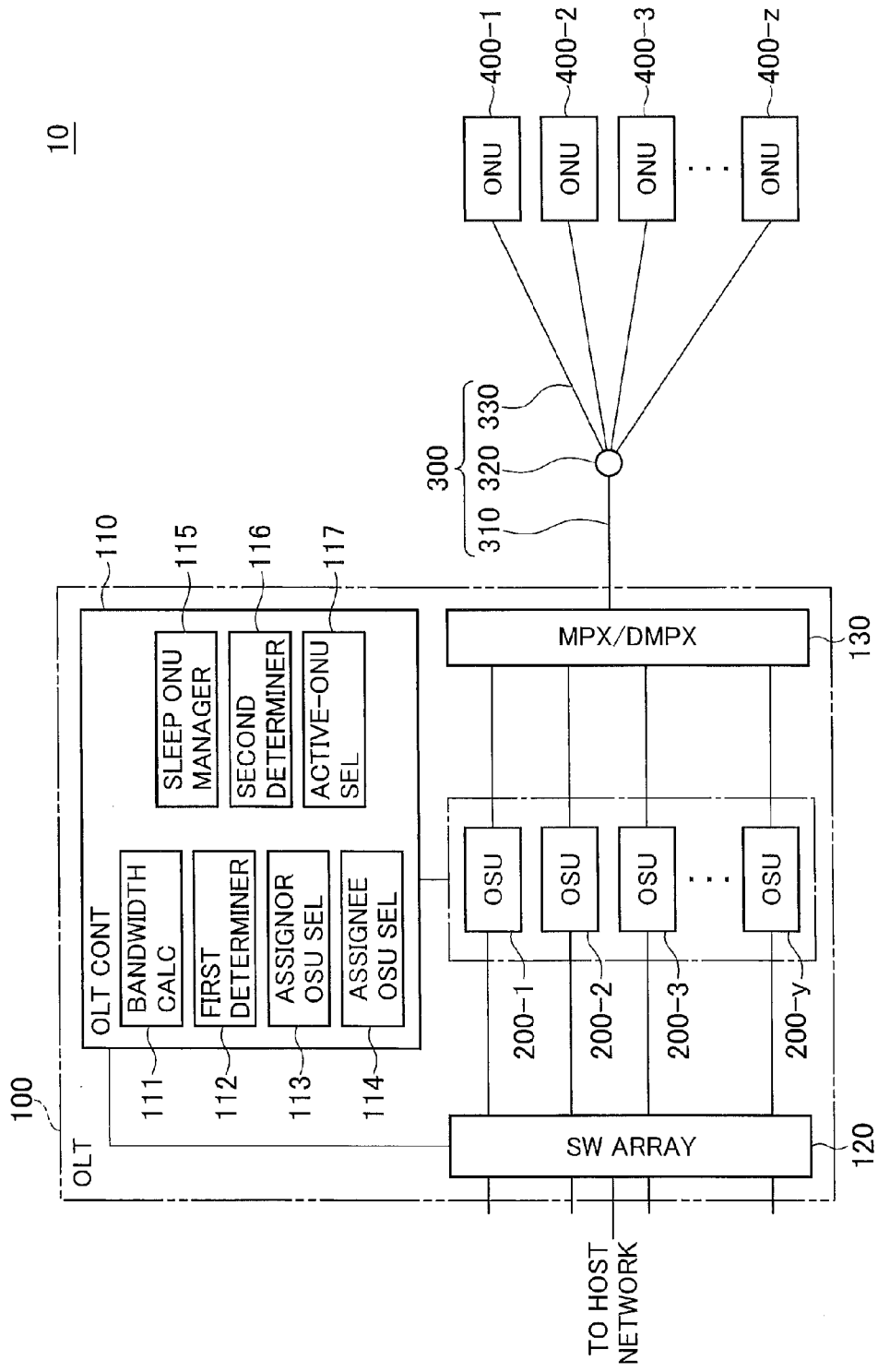
FIG. 3 is a schematic block diagram of a configuration of a TDM/WDM-PON in accordance with an illustrative embodiment of the present invention.

With reference first to FIG. 3, in the preferred embodiment, a dynamic wavelength allocation (DWA) control is used in a time division multiplex/wavelength division multiplex-passive optical network (TDM/WDM-PON) 10. A configuration of the TDM/WDM-PON 10 will be described.

The TDM/WDM-PON 10 includes an optical line terminal (OLT) 100, an optical transmission channel 300, and a plurality (z) of optical network units (ONUs) 400 connected to the OLT 100 by an optical transmission channel 300, where z is a natural number. The OLT 100, which may be central-office equipment installed in a telecommunications carrier's premises, includes an OLT controller (CONT) 110, a switching (SW) array 120, a plurality (y) of optical subscriber units (OSUs) 200 and a multiplexer/demultiplexer (MPX/DMPX) 130, which are interconnected as depicted, where y is also a natural number.

The optical transmission channel 300 includes, for example, optical fiber lines 310 and 330 and an optical splitter 320. In the exemplary configuration illustrated in FIG. 3, the optical fiber line 310 is connected to the multiplexer/demultiplexer 130 of the OLT 100 and the optical splitter 320 to branch into the optical fiber lines 330, which are in turn connected to the respective ONUs 400.

The ONUs 400, which are a kind of subscriber units, may be the same structure as each other, and adapted to produce an upstream optical signal carrying upstream data received from a corresponding user terminal, not shown, and an upstream control signal for requesting the OLT 100 for a bandwidth or for use in other purposes to transmit the upstream optical signal to a corresponding OSU 200 in the OLT 100.

The OSUs 200, which are a kind of central-office terminator units, may be the same structure as each other, and adapted to produce a downstream optical signal conveying downstream data received from a host, or global layer, telecommunications network and a downstream control signal for managing the ONUs 400 to transmit the downstream optical signal to the ONUs 400.

The exemplary configuration includes the plurality (y) of OSUs 200-1 to 200-$y$ and the plurality (z) of ONUs 400-1 to 400-$z$, the numbers y and z of OSUs 200 and ONUs 400, respectively, being arbitrary. Details of configurations and functions of the OSUs 200 and ONUs 400 will be described later.

In the TDM/WDM-PON 10, each of the ONUs 400 may be registered with either one of the plurality of OSUs 200.

In the TDM/WDM-PON 10, the OSUs 200 are allocated to wavelengths different from each other. Thus, each of the OSUs 200 transmits a downstream optical signal on the wavelength thus specifically allocated thereto while each of the OSUs 200 receives an upstream optical signal on the allocated wavelength.

By contrast, each of the ONUs 400 transmits an upstream optical signal on a wavelength on which the OSU 200 in which that ONU 400 is registered can receive. Between the ONUs 400 registered in each OSU 200, mutually different transmission timing is allocated in order to prevent upstream optical signals from colliding with each other.

In the TDM/WDM-PON 10, the plurality of ONUs 400 are distributively managed by the plurality of OSUs 200 so that each of the ONUs 200 may adaptively be allocated to and managed by either one of the OSUs 200. Between the ONUs 400, the DWA is controlled in response to the amount of traffic loaded on the OSUs 200, thereby substantially flattening the amount of traffic between the OSUs 200. As a result, the service bandwidths can be more available to subscriber terminals.

The OLT controller 110 of the OLT 100 serves to manage information about the ONUs 400 registered in the OSUs 200, i.e. PON link information. The OLT controller 110 stores the PON link information readably and rewritably in a memory, not depicted, such as a random access memory (RAM). The OLT controller 110 uses information such as the destination of downstream data and traffic data received from the switching array 120 as well as the PON link information to arrange a transmission plan. The OLT controller 110 provides the transmission plan to the switching array 120 and the OSUs 200.

While the OLT controller 110 allocates the ONUs 400 to such appropriate ones of the OSUs 200 that are to manage the ONUs 400, the controller 110 adjusts, under the DWA control for each OSU 200, the number of ONUs 400 to be managed by that OSU 200 so as to substantially flatten the amount of traffic between the OSUs 200. Before performing DWA, the OLT controller 110 presets for each OSU 200 a threshold for bandwidth that can be allocated to the ONUs 400 to be managed. The threshold may be set smaller than the maximum bandwidth available to each OSU 200, for example, 80% of the maximum bandwidth. The threshold may be set for either the bandwidth on which downstream signals are transmitted to the ONUs 400 or the bandwidth on which upstream signals are received from the ONUs 400.

When there is an OSU 200 whose total bandwidth allocated in use to the associated ONUs 400 exceeds the threshold, the OLT controller 110 performs DWA to shift the management of one or more ONUs 400 from the OSU 200 whose total bandwidth in use exceeds the threshold to another OSU 200 whose bandwidth in use is well below its threshold. In the context, the former OSU may be referred to as an assignor OSU, and the latter, i.e. other OSU to an assignee OSU.

Note that if the threshold is set for the bandwidth on which downstream signals are transmitted, the OLT controller 110 uses information about downstream data traffic that is provided from the switching array 120 to determine the total bandwidth in use for downstream signals of each OSU 200. The OLT controller 110 compares the total bandwidth in use for downstream signals of each OSU 200 with the threshold to determine whether to switch, i.e. change, that OSU 200 currently managing the ONUs 400 to another one.

By contrast, if the threshold is set for the bandwidth on which upstream signals are transmitted, the OLT controller 110 uses information on a requested bandwidth contained in REPORT messages transmitted from the ONUs 400 to an OSU 200 at dynamic band allocation (DBA) time intervals to determine the total bandwidth in use for upstream signals of the OSU 200. The information about the requested bandwidth contained in the REPORT message transmitted from an ONU 400 is provided from an OSU 200 having received that REPORT message to the OLT controller 110. The OLT controller 110 compares the total bandwidth in use for upstream signals of each OSU 200 with the threshold to determine whether to change the OSU 200 managing the ONU 400.

When the OSU 200 to manage the ONU 400 is switched to another, or assignee, OSU 200 according to DWA, the OLT controller 110 provides the assignor and assignee OSUs 200 with information on the changing of the OSU 200 managing that ONU 400.

The DWA control function is implemented by the functional sections of the OLT controller 110, which are a bandwidth calculator (CALC) 111, a first determiner 112, an assignor OSU selector (SEL) 113, an assignee OSU selector 114, a sleep ONU selector 115, a second determiner 116 and an active-ONU selector 117. The details of those functional sections will be described later.

In addition to the DWA control function, the OLT controller 110 includes the function of managing the states of the OSUs 200, such as identifying a faulty OSU 200 and identifying a newly added OSU 200.

The switching array 120 serves as establishing a communication path between the host, or upper-layer, network and each of the OSUs 200. The switching array 120 distributes downstream data to the OSUs 200 on the basis of a transmission plan provided from the OLT controller 110, and transmits upstream data received from the OSUs 200 to the host network. In addition, the switching array 120 provides information on, e.g. the destinations and traffic of downstream data transmitted from the host network, to the OLT controller 110.

The multiplexer/demultiplexer 130 is adapted to multiplex downstream optical signals sent on different wavelengths from the OSUs 200 with each other, and send the multiplexed signal to ONUs 400 over the optical transmission channel 300. The multiplexer/demultiplexer 130 is also adapted to demultiplex a wavelength-multiplexed and time-multiplexed upstream optical signal transmitted from each ONU 400 over the optical channel 300 into signals on different wavelengths, and transfer the demultiplexed signals to appropriate ones of the OSUs 200 corresponding to the wavelengths.

Figure 4:
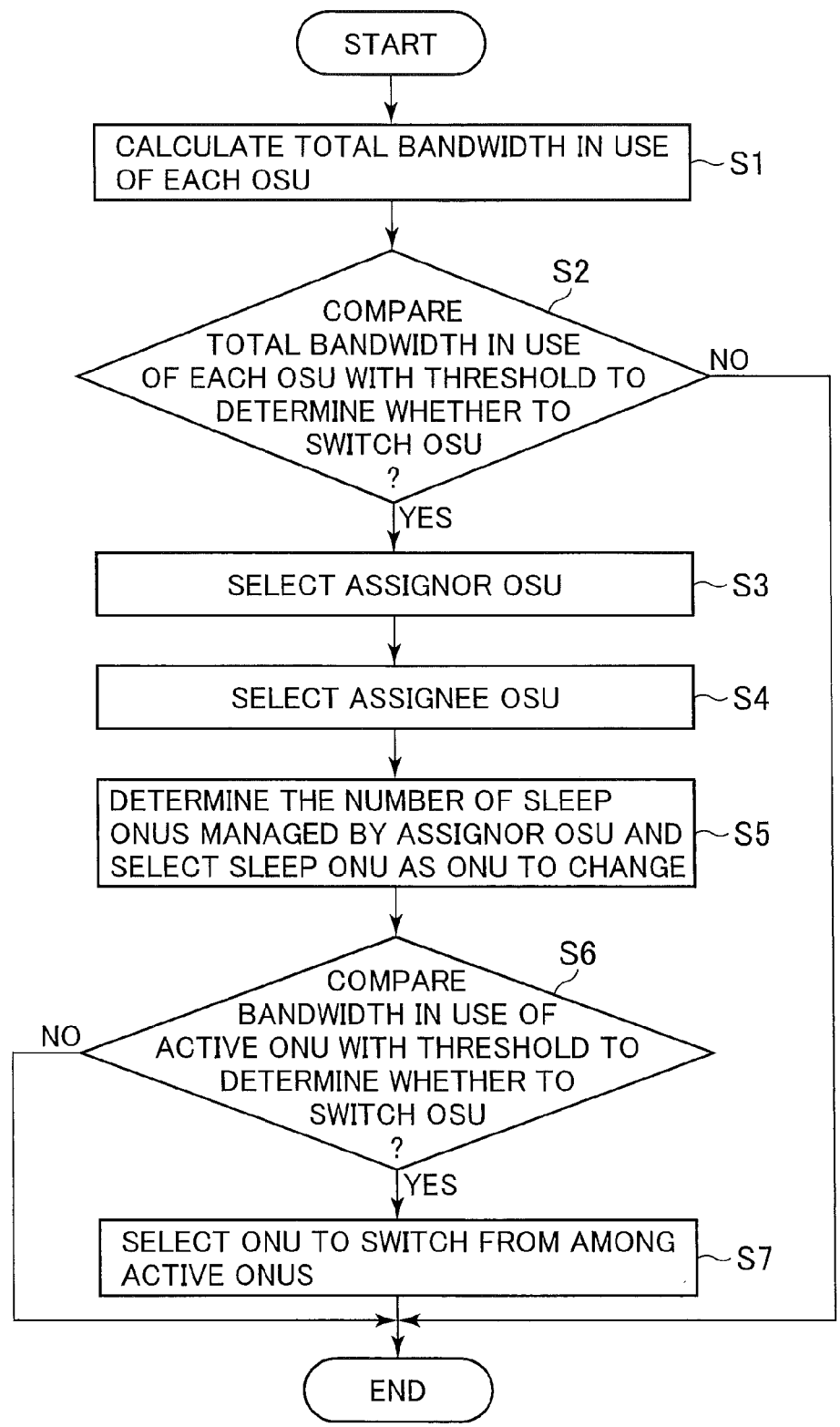
FIG. 4 is a flowchart illustrating a DWA control conducted by the illustrative embodiment shown in FIG. 3.

A DWA control method according to the present embodiment will be described with reference to FIGS. 4 and 5. FIG. 4 is a flowchart illustrating a process of DWA performed by the OLT controller 110 of the OLT 100 in the instant illustrative embodiment of the DWA control. In the present embodiment, the OLT controller 110 of the OLT 100 performs the process of DWA illustrated in the flowchart of FIG. 4 at predetermined time intervals. The process is executed by the functional sections 111 to 117, FIG. 3, of the OLT controller 110. FIGS. 5A, 5B and 5C illustrate how an OSU 200 changes the bandwidths to be allocated in use to ONUs 400 under management from time to time, which will be detailed later. In those figures, the vertical axis represents bandwidth in use in arbitrary unit. Note that, in this example, 80% of the maximum bandwidth available for communication with ONUs is set as the threshold at the OSUs.

First, the bandwidth calculator 111 of the OLT controller 110 calculates, for each OSU, the total bandwidth allocated in use to ONUs 400 in step S1, FIG. 4. As described above, the OLT controller 110 has preset, for each OSU, a threshold for the bandwidth in use. The threshold is set either for the bandwidth in use on which downstream signals are transmitted to ONUs 400 or the bandwidth in use on which upstream signals are received from ONUs 400. If the threshold is set for the bandwidth in use on which downstream signals are transmitted, the bandwidth calculator 111 calculates the total bandwidth used by each OSU 200 for transmitting downstream signals. If the threshold is set for the bandwidth in use on which upstream signals are received, the bandwidth calculator 111 calculates the total bandwidth used by each OSU 200 for receiving upstream signals.

Then the first determiner 112 of the OLT controller 110 compares in step S2 the total bandwidth in use of each OSU calculated in step S1 with the threshold to determine whether to switch the management of the ONU 400 to another OSU 200. As described earlier, the threshold is set smaller than the maximum bandwidth available to each OSU, i.e. 80% of the maximum bandwidth in this example. When there is no OSU 200 whose total bandwidth in use exceeds the threshold, the DWA ends without changing the management of the ONU 400.

Figure 5A:
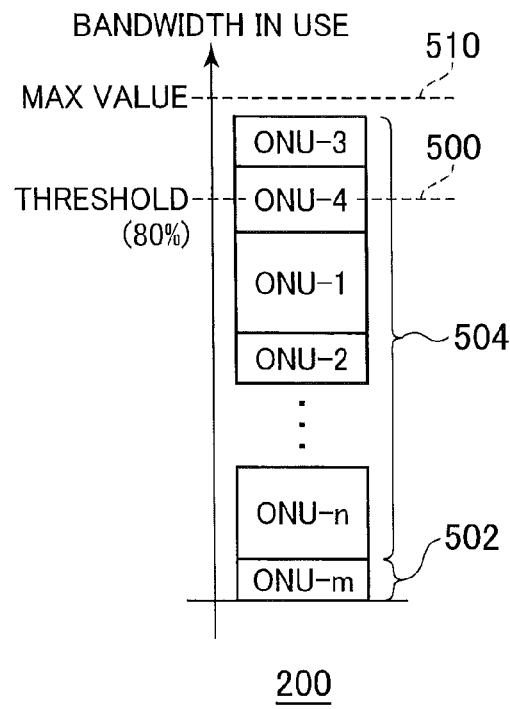
FIGS. 5A, 5B and 5C schematically show, like with FIGS. 2A and 2B, bandwidths allocated in use to ONUs managed by an OSU under the DWA control in the illustrative embodiment shown in FIG. 3.

By contrast, when there is an OSU or OSUs 200 whose total bandwidth in use exceed the threshold 500, as with the OSU 200 shown in FIG. 5A, for example, the assignor OSU selector 113 of the OLT controller 110 selects in step S3 another OSU 200 to which the management of one or some of the ONUs 400 by the assignor OSU 200 in question is to be shifted. For example, an OSU 200 that has its total bandwidth largest in use is selected as an assignor OSU. In a subsequent step, the management of one or more of the ONUs 400 managed by that assignor OSU will be shifted to another OSU 200. The example shown in FIGS. 5A and 5B in which the depicted OSU 200 is selected as an assignor OSU will now be described.

Now, the assignee OSU selector 114 of the OLT controller 110 selects an assignee OSU 200 in step S4. For example, an OSU 200 that has its total bandwidth smallest in use is selected as an assignee OSU 200. The assignee OSU 200 thus selected will be a new OSU 200 that is going to manage an ONU or ONUs 400 of which the management will be shifted from the assignor OSU 200.

Then the sleep ONU selector 115 of the OLT controller 110 determines in step S5 how many of the ONUs 400 managed by an assignor OSU 200 in question are in sleep mode, in other words, how many sleep ONUs 400 are currently controlled or included in an assignor OSU 200 in question. When there are a sleep ONU or ONUs 400, i.e. the number of sleep ONUs 400 is not zero, the sleep ONU selector 115 then selects the sleep ONU or ONUs 400 of which the management is to be shifted to an assignee OSU 200.

In the example shown in FIG. 5A, an ONU-m stays sleep among the ONUs 400 currently managed by the assignor OSU 200. Accordingly, the sleep ONU-m is determined as an ONU whose management is to be shifted to an assignee OSU 200. There may be a case where the assignor OSU 200 manages plural sleep ONUs 400. In that case, plural sleep ONUs 400 may be selected as ONUs 400 of which the management is to be shifted to the assignee OSU 200.

Then the second determiner 116 of the OLT controller 110 calculates a bandwidth the assignor OSU 200 has allocated to the ONU 400 that is in its sleep mode, namely, calculates a sleep ONU bandwidth 502. The second determiner 116 in turn subtracts the sleep ONU bandwidth 502 from the total bandwidth in use of the assignor OSU 200 to thereby obtain a bandwidth allocated in use to the active ONUs 400, i.e. a bandwidth for use in active ONUs 504. The second determiner 116 compares the bandwidth allocated in use to the active ONUs 504 with the threshold 500. Based on the result of the comparison, the second determiner 116 determines in step S6 whether to switch the OSU 200 managing the active ONUs 400 to another one. If the active ONU bandwidth 504 of the assignor OSU 200 does not exceed the threshold 500, only the sleep ONU 400 is determined as an ONU the management of which is to be shifted to an assignee OSU 200. Then the DWA ends without selecting the active ONUs 400 as ONUs 400 the management of which are to be shifted to an assignee OSU 200.

Figure 5B:
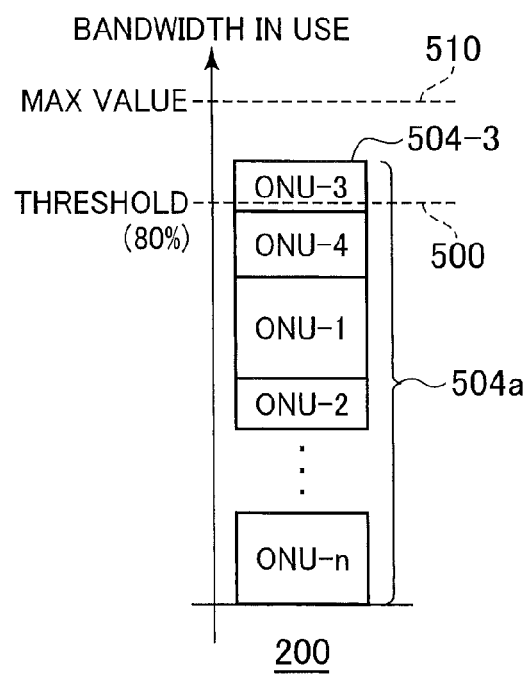
Figure 5C:
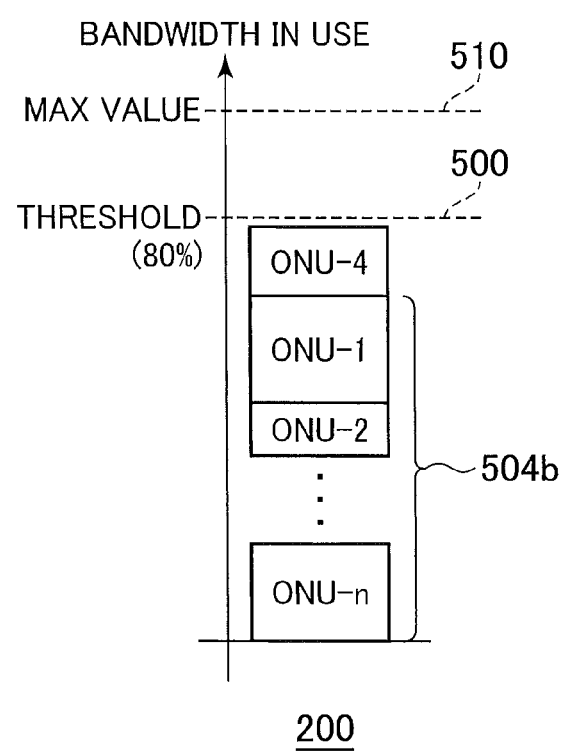

Now, in the example shown in FIG. 5B, the active ONU bandwidth 504a resulting from the subtraction of the sleep ONU bandwidth 502 exceeds the threshold 500. Thus, the second determiner 116 determines that the management of the active ONUs needs to be shifted from the OSU 200 currently managing those active ONUs 400, and the DWA flow illustrated in FIG. 4 proceeds to step S7. In the OLT 100, after the DWA flow shown in FIG. 4 has completed, the OLT controller 110 will actually proceed to transferring the ONU management to an assignee OSU. Thus, FIG. 5B depicts the active ONU bandwidth 504a the OLT controller 110 has logically calculated out.

If the active ONU bandwidth 504a at the assignor OSU 200 exceeds the threshold 500, the active-ONU selector 117 selects in step S7 an ONU whose management is to be shifted to the assignee OSU 200 from among the active ONUs 400. An active ONU of which the management is to be changed may be selected at random, for example. Specifically, the active-ONU selector 117 selects the active ONUs 400 at random, and accumulates the bandwidths allocated in use to the ONUs 400 thus selected. At the moment when an active ONU 400 is selected and its bandwidth in use is added to result in exceeding the threshold 500, the bandwidth of that active ONU 400 would not be added but will be determined as an ONU whose management is to be changed together with active ONUs 400 that remain at that moment but do not have the bandwidths accumulated yet. In the example shown in FIG. 5B, as a result of adding active ONU bandwidths 504a one after another, the added, total bandwidth resultant at the time when the active ONU bandwidth 504-3 for ONU-3 is last added exceeds the threshold 500 as illustrated. In that case, ONU-3 will be selected as an ONU whose management is to be changed. After selecting the ONU-3 as an ONU whose management is to be changed, the OLT controller 110 ends the DWA.

The OLT controller 110 of the OLT 100, when having finished the DWA flow as described above, notifies the assignor OSU 200, the assignee OSU 200 and the switching array 120 of the ONU-3 whose management is to be changed. The assignor OSU 200 notifies the ONU-3 whose management is to be changed of transmission and reception wavelengths appropriate for the assignee OSU 200. If the ONUs 400 of which the management is to be changed include a sleep ONU or ONUs 400, the OLT controller 110 newly allocates transmission and reception wavelengths to the sleep ONU or ONUs 400, and notifies them of the newly allocated wavelengths in a time period during which the sleep ONU or ONUs 400 are temporarily activated or awoken during the cyclic sleep mode described earlier. When the ONU-3 of which the management is to be changed receives the notification, the ONU-3 changes the transmission and reception wavelengths accordingly to the assignee OSU 200.

In the example shown in FIG. 5A, the management of the sleep ONU-m and active ONU-3 is shifted from the assignor OSU 200 having its bandwidth in use as illustrated to the assignee OSU 200. As a result, the bandwidth in use 504b, FIG. 5C, at the assignor OSU 200 falls below the threshold 500.

Note that the example described so far is directed to the case in which the OSU 200 having its total bandwidth largest in use is selected as an assignor OSU 200 in step S3 of selecting an assignor OSU 200 in the flow shown in FIG. 4. However, if there are plural OSUs 200 that have the total bandwidths in use exceeding the threshold 500, all or some of those plural OSUs 200 can be selected as assignor OSUs 200.

Further, the example described above is directed to the case where the OSU 200 having its total bandwidth smallest in use is decided as an assignee OSU 200 in step S4 of selecting an assignee OSU 200. However, if there are plural OSUs 200 that have total bandwidths in use not exceeding the threshold 500, all or some of those plural OSUs 200 can be selected as assignee OSUs 200. In that case, ONUs 400 of which the management is to be changed are distributively managed by those plural assignee OSUs 200, and the management thereof will be shifted to those assignee OSUs 200.

If plural assignor OSUs and/or plural assignee OSUs 200 are selected, the amount of traffic can be efficiently evened out between those OSUs 200.

As has been described, according to the DWA control of the present embodiment, as ONUs the management of which is to be shifted to another managing OSU, sleep ONUs 400 are selected preferentially to active OSUs 200. If a sleep ONU is included among the ONUs 400 managed by the assignor OSU, the sleep ONU is selected as an ONU whose management is to be changed. Accordingly, a decrease in margin of bandwidth utilization in the assignor OSU due to the sleep ONU bandwidth is alleviated even in a system where the cyclic sleep is used. Then, based on the bandwidth resulting from subtraction of the sleep ONU bandwidth from the total bandwidth in use, that is, active ONU bandwidth, determination is made as to whether to change the management of active ONUs 400. Thus, when the active ONU bandwidth does not exceed the threshold, the management of active ONUs 400 is not excessively changed. Moreover, also when the active ONU bandwidth exceeds the threshold, the number of active ONUs 400 of which the management is to be shifted to another OSU 200 can be minimized. Unless traffic occurs suddenly, there is no traffic on a sleep ONU 400. Therefore, when the wavelength of a sleep ONU 400 is changed, interruption of communication or signal buffering is not required. Even when the management of active ONUs 400 is changed, the number of the active ONUs 400 whose management is to be changed can be minimized. Thus, the influence of interruption of communication and signal buffering when the management of active ONUs 400 is changed can be reduced. Thus, the DWA control method according to the present embodiment can alleviate communication delay due to changing of the management of ONUs 400 even in a system where the cyclic sleep is used.

The DWA control method according to the present embodiment can be implemented simply by adding steps S5 and S6 described above to the conventional DWA. Accordingly, increase in time required for DWA may be insignificant over conventional DWA.

The inventor of the present invention has verified in a simulation the effect of the use of the DWA control method according to the present embodiment on the efficiency of communication. In this simulation, changes in the efficiency of data transfer of one OSU 200 with respect to the number of sleep ONUs 400 managed by the OSU 200 were investigated. In the context, the efficiency of data transfer is the ratio of a time period exclusive of a time required for transferring a non-data upstream signal, i.e. time that can be considered to be upstream data transfer time, against a DBA time interval. In the simulation, the DBA time interval is 2,000 ms. The time required for transferring a REPORT message from an ONU 400 is 2,224 ns, including times of Ton, Toff and Sync. The OSU 200 manages 512 ONUs 400. In this simulation, the efficiency of data transfer of the OSU 200 when using conventional DWA was also investigated under the same conditions for comparison.

Figure 6:
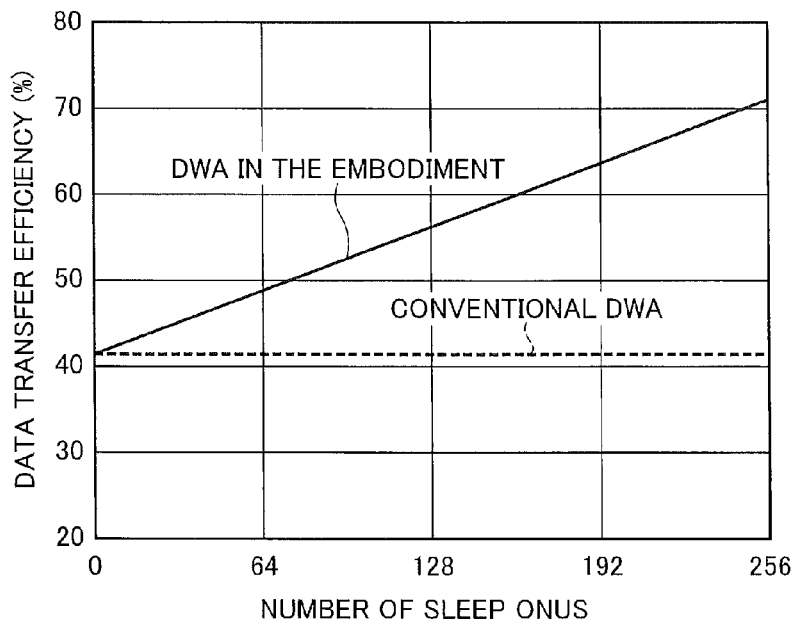
FIG. 6 is a graph plotting results of a simulation verifying the effect of the DWA control of the illustrative embodiment on the efficiency of communication.

FIG. 6 plots the results of the simulation. In the figure, the vertical axis represents the efficiency of data transfer of the OSU in percentage, and the horizontal axis represents the number of sleep ONUs managed by the OSU.

As seen from FIG. 6, the efficiency of data transfer of the OSU when the conventional DWA is used is constant regardless of changes in the number of sleep ONUs. By contrast, when the DWA control method according to the present embodiment is applied to the OSU 200, the management of sleep ONUs 400 are shifted to another OSU 200 preferentially to the active OSUs 400 as described above. As more sleep ONUs 400 become involved, the percentage of the sleep ONUs 400 to the ONUs whose management is to be changed increases. The bandwidth for the sleep ONUs 400 is associated with the transfer time of a REPORT message, which is a non-data upstream signal. Therefore, the changing of the management of a sleep ONU 400 causes the time required for transferring a REPORT message to be decreased. As such, the DWA control method according to the present embodiment thus applied improves the efficiency of data transfer of the OSU 200 in proportion to the number of sleep ONUs 400 as shown in FIG. 6.

Figure 7:
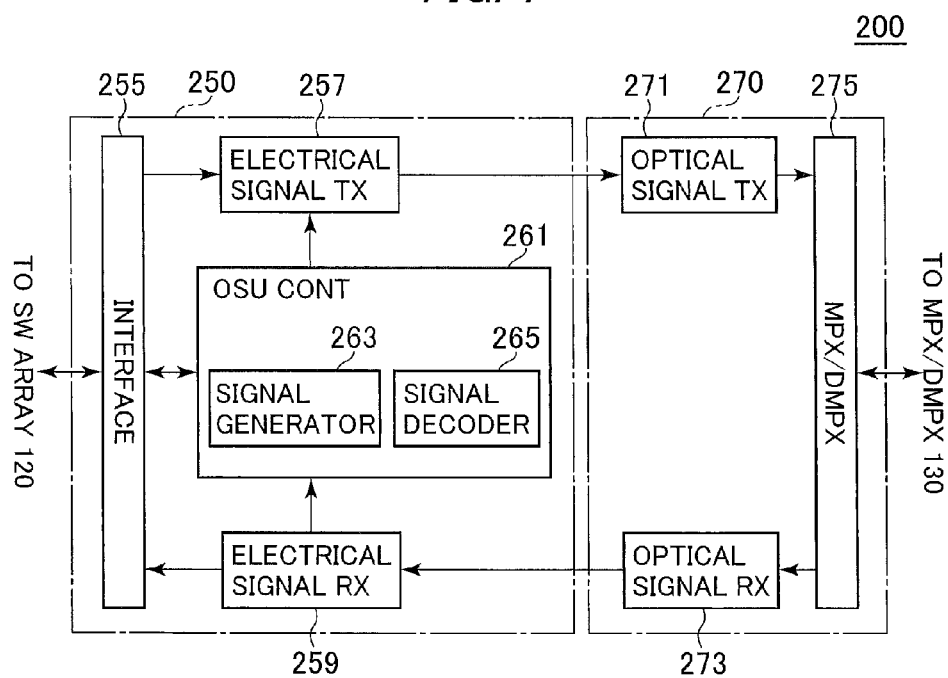
FIG. 7 is a schematic block diagram illustrating a configuration of an OSU of the embodiment.

A configuration of the OSU 200 will be described with reference to FIG. 7. The OSU 200 generally includes an electrical signal processor 250 and an optical signal processor 270. The electrical signal processor 250 includes an interface 255, an electrical signal transmitter (TX) 257, an electrical signal receiver (RX) 259 and an OSU controller 261, which are interconnected as depicted. The optical signal processor 270 includes an optical signal transmitter 271, an optical signal receiver 273 and a multiplexing/demultiplexing unit 275, which are interconnected as shown.

The interface 255 is adapted for transmitting and receiving upstream and downstream data to and from the host or global network, not shown, through the switching array 120. The interface 255 transfers downstream data received from the host network to the electrical signal transmitter 257. The interface 255 transmits upstream data received from the electrical signal receiver 259 to the host network.

The electrical signal transmitter 257 is adapted to use downstream data received from the interface 255 and a downstream control signal received from the OSU controller 261 to produce a downstream electrical signal. The downstream electrical signal is sent to the optical signal transmitter 271.

The optical signal transmitter 271 serves to convert a downstream electrical signal to a corresponding downstream optical signal. For that aim, the optical signal transmitter 271 may include an appropriate electrical-to-optical signal converter such as a laser diode (LD).

The multiplexing/demultiplexing unit 275 is adapted on one hand to transmit a downstream optical signal produced by the optical signal transmitter 271 to the ONUs 400 through the multiplexer/demultiplexer 130 over the optical transmission channel 300, and on the other hand to transfer an upstream optical signal received over the optical transmission channel 300 to the optical signal receiver 273. In the TDM/WDM-PON 10, light beams in different wavebands are used between downstream and upstream optical signals. Thus, the multiplexing/demultiplexing unit 275 may include, for example, a WDM filter to thereby multiplex and demultiplex upstream and downstream optical signals, respectively.

The optical signal receiver 273 functions as converting an upstream optical signal sent through the multiplexing/demultiplexing unit 275 to a corresponding upstream electrical signal. The optical signal receiver 273 may include an appropriate photoelectric transducer such as a photodiode (PD). The photodiode may be adapted to receive upstream optical signals at least in a waveband available to the ONUs 400. The upstream electrical signal is sent to the electrical signal receiver 259.

The electrical signal receiver 259 is adapted to separate an upstream electrical signal received from the optical signal receiver 273 into upstream data and an upstream control signal. The upstream data is transmitted to the host network through the interface 255 and the switching array 120, and the upstream control signal is sent to the OSU controller 261.

The OSU controller 261 may include functional sections of a signal generator 263 and a signal decoder 265, for example. The OSU controller 261 may be configured similarly to an OLT used in a conventional PON. The functional sections may be implemented by program sequences the OSU controller 261 can execute. Results from the processing by the functional sections may be stored in an appropriate storage, such as a RAM, not shown.

The signal generator 263 generating downstream control signals. The downstream control signals may include, for example, a bandwidth allocation signal, e.g. GATE message, generated on the basis of a transmission plan received from the OLT controller 110 through the interface 255 and a request for bandwidth received from the ONUs 400 to inform ONUs 400 of the transmission bandwidth and timing of an upstream optical signal, and a discovery gate message for use in a discovery sequence. The downstream control signal contains information such as information on the transmission wavelength of an upstream optical signal and reception wavelength of a downstream optical signal. As described earlier, in the TDM/WDM-PON 10, the ONUs 400 use specific wavelengths to perform communication with an OSU 200 in which the ONUs 400 have been registered. Thus, when the management of an ONU 400 is changed by the DWA, for example, the downstream control signal is used to direct that ONU 400 to transmit an upstream optical signal and receive a downstream optical signal on respective specific wavelengths coping with the assignee OSU 200. The downstream control signal is delivered to the electrical signal transmitter 257.

The signal decoder 265 serves to decode signals to extract information, such as a request for bandwidth carried by a REPORT message, contained in upstream control signals transmitted from the ONUs 400.

Figure 8:
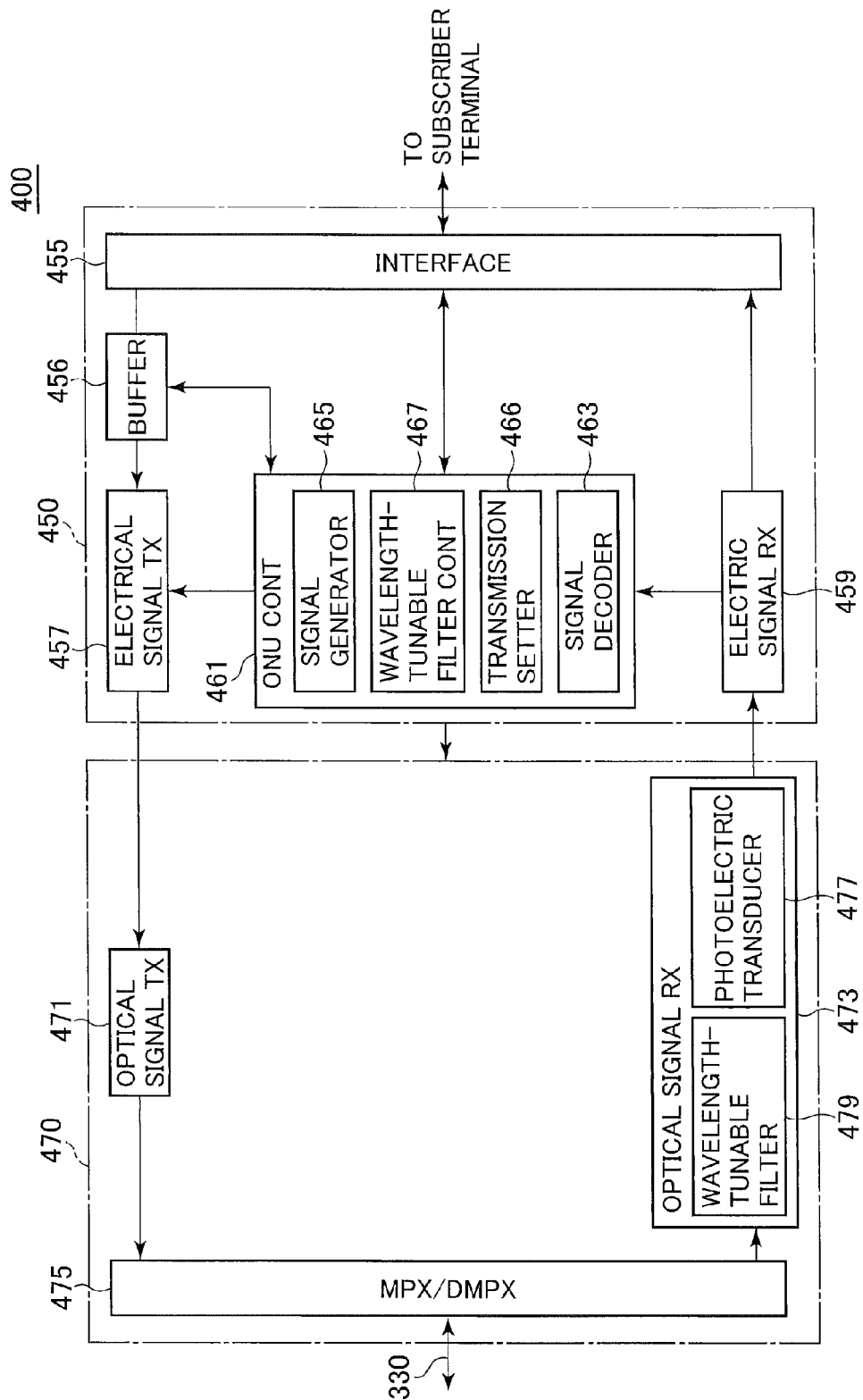
FIG. 8 is a schematic block diagram illustrating a configuration of an ONU of the embodiment.

A configuration of the ONU 400 will be described with reference to FIG. 8. The ONU 400 generally includes an electrical signal processor 450 and an optical signal processor 470.

The electrical signal processor 450 includes an interface 455, a buffer 456, an electrical signal transmitter 457, an electrical signal receiver 45 and an ONU controller 461, which are interconnected as illustrated. The optical signal processor 470 includes an optical signal transmitter 471, an optical signal receiver 473 and a multiplexer/demultiplexer 475, which are interconnected as depicted.

The multiplexer/demultiplexer 475 functions to direct upstream signals to the optical line 300 and downstream signals to the optical signal receiver 473. The multiplexer/demultiplexer 475 may include an appropriate multiplexer/demultiplexer device such as a WDM filter. Again, it may be recalled that in the TDM/WDM-PON 10, light beams in different wavebands are used between downstream and upstream optical signals. Thus, for example a WDM filter can be used to split upstream and downstream optical signals from each other.

The optical signal receiver 473 is adapted to convert a downstream optical signal sent through the multiplexer/demultiplexer 475 to a corresponding downstream electrical signal. The downstream electrical signal is sent to the electrical signal receiver 459. The optical signal receiver 473 includes a wavelength-tunable filter 479 and an appropriate photoelectric transducer 477 such as a photodiode, for example. The photodiode may be adapted to receive downstream optical signals at least in a waveband available for the OSUs 200.

The wavelength-tunable filter 479 is operative in response to an notification from a wavelength-tunable filter controller 467 of the ONU controller 461 to set its pass wavelength.

The electrical signal receiver 459 is adapted to separate a downstream electrical signal into a downstream data signal and a downstream control signal. The electrical signal receiver 459 on one hand sends the downstream data signal to a user terminal, not shown, through the interface 455, and on the other hand the downstream control signal to the ONU controller 461.

The interface 455 serves as transmitting and receiving upstream and downstream data signals to and from the user terminal.

The buffer 456 stores therein an upstream data signal sent from the user terminal through the interface 455. The buffer 456 informs the ONU controller 461 of the amount of stored data, i.e. buffered amount, and develops, under the control of the ONU controller 461, an upstream data signal to deliver the latter to the electrical signal transmitter 457.

The electrical signal transmitter 457 is adapted for using an upstream data signal received from the buffer 456 and an upstream control signal received from the ONU controller 461 to produce an upstream electrical signal. The upstream electrical signal will be delivered to the optical signal transmitter 471.

The optical signal transmitter 471 serves as converting an upstream electrical signal to a corresponding upstream optical signal. For that purpose, the optical signal transmitter 471 includes an appropriate wavelength-tunable electrical-to-optical signal converter such as a tunable laser diode (TLD). The wavelength of the upstream optical signal is set on the basis of an indication from a transmission setter 466. The upstream optical signal generated by the optical signal transmitter 471 is sent to the multiplexer/demultiplexer 475 and in turn transmitted to an OSU 200 on the optical transmission channel 300.

The ONU controller 461 includes a signal decoder 463, a signal generator 465 and a wavelength-tunable filter controller 467 in addition to the transmission setter 466 described above.

The signal decoder 463 serves as decoding signals to extract information required for communication with an OSU 200, such as information on the transmission bandwidth, transmission timing and transmission wavelength of an upstream optical signal, and the reception wavelength of a downstream optical signal contained in a downstream control signal.

The signal generator 465 uses the buffered amount notified by the buffer 456 to generate an upstream control signal such as a REPORT message that is to be provided to an OSU 200. The upstream control signal is sent to the electrical signal transmitter 457.

The transmission setter 466 is adapted to provide the optical signal transmitter 471 with information such as information about the wavelength, transmission timing and transmission wavelength of an upstream optical signal extracted by the signal decoder 463.

The wavelength-tunable filter controller 467 is adapted to inform the wavelength-tunable filter 479 of a change of pass wavelength and a pass wavelength to set.

The entire disclosure of Japanese patent application No. 2014-063811 filed on Mar. 26, 2014, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A dynamic wavelength allocation control method in a controller of central-office equipment forming an optical communications network together with a plurality of subscriber units connected to the central-office equipment by an optical transmission channel, the central-office equipment including a plurality of terminator units, each of which is allocated to one of wavelengths which is different from each other, each of the subscriber units including a wavelength-tunable filter, said method comprising:
    calculating, for each of the plurality of terminator units, a total bandwidth allocated in use to the subscriber units managed by the terminator unit;
    comparing, for each of the plurality of terminator units, the total bandwidth in use with a predetermined threshold to determine whether to change the terminator unit managing the subscriber units;
    selecting, when a result of the comparing reveals that at least one of the plurality of terminator units has the total bandwidth in use exceeding the threshold, an assignor terminator unit from among the at least one terminator unit;
    determining a number of subscriber units staying in sleep mode among the subscriber units managed by the assignor terminator unit, and selecting, if the number is not zero, one of the subscriber units which is in sleep mode as an subscriber unit of which management is to be changed;
    calculating a bandwidth by subtracting a bandwidth allocated to the selected subscriber unit from the total bandwidth in use of the assignor terminator unit, and comparing the calculated bandwidth with the threshold to determine whether to change an terminator unit managing active one of the plurality subscriber units; and
    selecting, when the calculated bandwidth exceeds the threshold, an subscriber unit of which the management is to be changed from among the active subscriber units managed by the assignor terminator unit.

2. The method in accordance with claim 1, wherein when selecting the assignor terminator unit, at least two of the plurality of terminator units are selected.

3. The method in accordance with claim 1, wherein when the result of the comparing reveals that at least one of the plurality of terminator units has the total bandwidth in use exceeding the threshold, at least two assignee terminator units are selected, and the subscriber units of which the management is to be changed are distributed to the at least two assignee terminator units and separately managed among the at least two assignee terminator units.

4. The method in accordance with claim 1, wherein the optical communications network is a passive optical network using time division multiplex and wavelength division multiplex, the central-office equipment being an optical line terminal, the plurality of terminator units being optical subscriber units, the plurality of subscriber units being optical network units.

5. Central-office equipment forming an optical communications network together with a plurality of subscriber units connected to said central-office equipment by an optical transmission channel, said equipment including a plurality of terminator units, each of which is allocated to one of wavelengths which is different from each other, each of the subscriber units including a wavelength-tunable filter, said equipment comprising a controller which comprises:
    a bandwidth calculator calculating, for each of the plurality of terminator units, a total bandwidth allocated in use to the subscriber units managed by, the terminator unit;
    a first determiner comparing, for each of the plurality of terminator units, the total bandwidth in use with a predetermined threshold to determine whether to change the terminator unit managing the subscriber units;
    an assignor terminator unit selector selecting an assignor terminator unit from among at least one of the plurality of terminator units which has the total bandwidth in use exceeding the threshold;
    a sleep subscriber unit selector determining a number of subscriber units staying in sleep mode among the subscriber units managed by the assignor terminator unit, and selecting, if the number is not zero, one of the subscriber units which is in sleep mode as an subscriber unit of which management is to be changed;
    a second determiner calculating a bandwidth by subtracting a bandwidth allocated to the selected subscriber unit from the total bandwidth in use of the assignor terminator unit, and comparing the calculated bandwidth with the threshold to determine whether to change an terminator unit managing active one of the plurality of subscriber units; and
    an active subscriber unit selector selecting, when the calculated bandwidth exceeds the threshold, an subscriber unit of which the management is to be changed from among the active subscriber units managed by the assignor terminator unit.

* * * * *